United States Patent [19]  
Janssen et al.

[11] Patent Number: 4,477,274  
[45] Date of Patent: Oct. 16, 1984

[54] DEVICE FOR DRAWING AN OPTICAL FIBRE

[75] Inventors: Petrus J. Janssen; Victor A. van der Hulst, both of Eindhoven, Netherlands

[73] Assignee: U.S. Philips Corporation, New York, N.Y.

[21] Appl. No.: 531,973

[22] Filed: Sep. 14, 1983

[30] Foreign Application Priority Data

Jul. 27, 1983 [NL] Netherlands .................. 8302666

[51] Int. Cl.³ .................................... C03B 37/025
[52] U.S. Cl. ....................................... 65/13; 65/1; 65/374.1
[58] Field of Search .................. 65/1, 2, 13, 374.1

[56] References Cited

U.S. PATENT DOCUMENTS 4,030,901 6/1977 Kaiser .......................................... 65/2
4,309,201 1/1982 Klop et al. ................................... 65/2
4,400,190 8/1983 Briere ......................................... 65/13

Primary Examiner—Robert Lindsay  
Attorney, Agent, or Firm—Marc D. Schechter

[57] ABSTRACT

An improved sealing of the inlet channel of a drawing furnace for optical fibres can be achieved by using one or more silicon rubber discs having an aperture whose diameter is smaller than that of the preform.

Burning of the silicon rubber discs can be checked by a choice of the material for the discs having a refractive index smaller than that of the preform so that thermal radiation is not irradiated in the disc via the preform.

The silicon rubber discs are further protected by a metal screening between the discs and the interior of the drawing furnace.

7 Claims, 2 Drawing Figures

DEVICE FOR DRAWING AN OPTICAL FIBRE

The invention relates to a device for drawing an optical fibre from a cylindrical solid preform, which device comprises a heating space having an inlet channel and an outlet channel, in which a conical end of a preform from which the fibre is drawn is heated to the drawing temperature, said device comprising means to seal the heating space against a gas flow through the gap between the preform and the wall of the inlet channel. Such a gas flow may be caused by convection. Such a gas flow may disturb the shape of the conical end of the preform, as a result of which a variation in the diameter of the drawn fibre occurs. Suppression of the gas flow is therefore desired.

A device for drawing an optical fibre is described, for example, in U.S. Pat. No. 4,309,201. A gas flow through the gap between the preform and the wall of the inlet channel is slightly restricted by providing the inlet channel with sealing partitions. In order to not adversely influence the strength of the drawn fibre, said sealing partitions may not make any mechanical contact with the preform. As a result of this, gas flows remain possible having for their result variations of the shape of the conical end of the preform.

U.S. Pat. No. 4,030,901 describes a device in which the inlet channel is sealed by means of a silica rubber ring having a circular cross-section through which the preform is guided. Such a silica rubber ring permits only of small lateral displacements of the preform and a strong friction occurs between the preform and the silica rubber ring. Due to the thickness variations of the preform it is not possible to simultaneously achieve a good sealing and a low friction. Moreover, the silica rubber ring is heated by the preform as a result of which the life of the ring is restricted.

It is an object of the invention to provide a device for drawing an optical fibre from a solid preform in which the inlet channel for the preform comprises sealing means which are flexible and which ensure a good sealing without the fibre strength being adversely influenced by the mechanical contact and in which the heat flow to the sealing means is restricted so that the latter can be used for a longer period of time.

According to the invention this object is achieved in that the inlet channel for the preform is provided with sealing means which consist of at least one exchangeable flat flexible disc of a polymeric organosilicon compound (silicon rubber) having a refractive index smaller than that of the preform and a 100% modulus between 0.5 and 5 MPa, said disc comprising a central aperture whose diameter is at least 1 mm smaller than the smallest diameter of the preform to be drawn into a fibre, at least one exchangeable temperature-resistant heat-conducting screening being present between the disc or discs and the heating space, said screening comprising a central aperture which can pass the preform without making a mechanical contact and the diameter of which is not more than 1 mm larger than the largest diameter of the preform. The 100% modulus is the modulus at a relative elongation of 100% measured according to the international standard ISO 37-1977 (E).

The invention is based on the recognition of the fact that there are three important heat flows from the heating space to the sealing means. The first heat flow is by convection between the preform and the wall of the inlet channel. Said heat flow is suppressed by using sealing means according to the invention.

The second heat flow is by radiation from the heating space to the sealing means. This heat flow can be reduced by placing a temperature-resistant heat-conducting screening between the sealing means and the interior of the furnace.

The third heat flow to the sealing means is by radiation through the preform. Said heat flow can be decreased by using sealing means which consist of a material having a refractive index which is smaller than that of the material of the preform as a result of which internal reflection keeps occurring of the heat radiation in the preform. The temperature of the preform which is moved in the direction of the heating space at this point is not yet so high that damage to the sealing means occurs which adversely influences the function thereof. A suitable material is polydimethylsiloxane having a refractive index between 1.40 and 1.42.

A flat flexible disc has a larger number of mechanical degrees of freedom than a ring having a circular cross-section as a result of which narrow tolerances and a good sealing become possible without a rigid connection being formed between the preform and the inlet channel.

The flexibility of the sealing is particularly great when the thickness of the silicon rubber disc is smaller than the difference in radius of the inlet channel and the preform to be drawn into a fibre so that the disc can easily bend in the direction of movement of the preform.

The heat transfer from the preform to the silicon rubber disc is particularly small when the difference in radius of the preform to be drawn into a fibre and the central aperture of the silicon rubber disc is chosen to be so that the contact between the disc and the preform is substantially a line contact. In that case the friction between the silicon rubber disc and the preform is also minimum.

In a preferred embodiment of the drawing device according to the invention the sealing means consist of two exchangeable flat discs which are provided at some distance from each other in the inlet channel. As a result of this the sealing is improved because both discs will usually not transmit gas simultaneously when a (curved) preform is laterally displaced.

In a further embodiment according to the invention the temperature-resistant heat-conducting screening consists of a cooled ring of stainless steel.

The invention will now be described in greater detail with reference to the accompanying drawing, in which FIG. 1 is a longitudinal sectional view through a prior art device for drawing optical fibres, and FIG. 2 is a longitudinal sectional view of an inlet channel of such a device according to the invention.

The device 10 for the manufacture of optical fibres shown in FIG. 1 comprises a substantially tubular, exchangeable heat element 12 of graphite which comprises a central cylindrical heating chamber 14 and which is fixed between two housing portions 16 and 18 which are connected together by screwed joints 20. The heating element 12 is heated by direct current passage and for this purpose it is connected to terminals 22 for the connection of a supply source which is not shown. The housing portion 16 comprises an inlet aperture 24 for leading-in a preform 26 in the heating chamber 14, in which inlet aperture sealing partitions 28 are provided. The housing portion 18 comprises an outlet aperture 30 for the formed fibre 32, in which outlet aperture a sealing partition 34 is provided.

The use of the FIG. 2 embodiment of the invention is not restricted to a device as described above but is also possible in devices having a heating element of another type, for example an element heated by induction, and in devices of which the interior is flushed with an inert gas. In this latter device the gas consumption can be considerably decreased by using sealing means according to the invention.

FIG. 2 shows a part of a drawing device 10 which comprises an inlet channel 40 for the preform 26. The interior of the drawing device 10 is sealed against a gas flow through the gap between the inlet channel 40 and the preform 26 by means of silicon rubber discs 42, separated from each other by a spacing ring 44 and fixed by means of a nut 46. A stainless steel screen 48 is placed between the sealing means 42 and the interior of the drawing device 10. Said screening can be cooled by known means which are not shown in the Figure.

The central circular aperture of the silicon rubber discs 42 has right angles and is at least 1 mm smaller than the smallest diameter of the preform to be processed. The thickness of the silicon rubber discs 42 is smaller than the difference in radius of the inlet channel and the preform. The silicon rubber discs 42 are flexible and are deformed so that they form substantially a line contact with the preform 26. As a result of this, both the heat transfer and the friction between the preform 26 and the silicon rubber discs 42 are made as small as possible.

The silicon rubber discs 42 and the screening 48 each can be exchanged. For each preform 26 to be processed, one or more silicon rubber discs 42 and one or more screenings 48 are chosen and placed which satisfy the abovedescribed conditions for the diameter of the central aperture with respect to the diameter of the preform and the diameter of the inlet channel. For drawing optical fibres, preforms are commonly used having a diameter which is larger than 10 mm and smaller than 25 mm. Diameter variations up to 5% of the diameter of the preform can readily be compensated by the use of sealing means according to the invention.

The invention leads to an increase of the tensile strength and a decrease of the damping of glass fibres, for example, for optical transmission. By suppressing variations of the shape of the conical end of the preform it can be achieved that the diameter variation of the optical fibre is smaller than $0.2\mu$ with a fibre diameter of $125\mu$.

What is claimed is:

1. A device for drawing an optical fibre from a cylindrical solid preform, which device comprises a heating space having an inlet channel and an outlet channel in which a conical end of a preform is heated to the drawing temperature, said device comprising means to seal the heating space against a gas flow through the gap between the preform and the wall of the inlet channel, characterized in that said means comprise at least one exchangeable flat flexible disc of a polymeric organosilicon compound having a refractive index smaller than that of the preform and a 100% modulus between 0.5 and 5 MPa, said disc comprising a central aperture whose diameter is at least 1 mm smaller than the smallest diameter of the preform to be drawn into a fibre, at least one exchangeable temperature-resistant heat-conducting screening being present between the disc or discs and the heating space, the said screening comprising a central aperture which can pass the preform without making mechanical contact and whose diameter is not more than 1 mm larger than the largest diameter of the preform.

2. A device as claimed in claim 1, characterized in that the disc or discs comprise a polymeric organosilicon compound having a 100% modulus between 1 and 2 MPa.

3. A device as claimed in claim 1, characterized in that the thickness of the flat flexible disc is smaller than the difference in radius of the inlet channel and the preform to be drawn into a fibre.

4. A device as claimed in claim 3, characterized in that the difference in radius of the preform to be drawn into a fibre and the central aperture of the flat flexible disc is chosen to be so that the contact between the disc and the preform is substantially a line contact.

5. A device as claimed in claim 1, characterized in that the sealing means consist of two exchangeable flat discs which are provided at some distance from each other in the inlet channel.

6. A device as claimed in claim 1, characterized in that the screening is a cooled ring of stainless steel.

7. A device as claimed in claim 1, characterized in that the polymeric organosilicon compound is polydimethylsiloxane.

* * * * *

UNITED STATES PATENT AND TRADEMARK OFFICE
CERTIFICATE OF CORRECTION

PATENT NO. : 4,477,274
DATED : October 16, 1984
INVENTOR(S) : PETRUS J. JANSSEN; VICTOR A. VAN DER HULST It is certified that error appears in the above—identified patent and that said Letters Patent is hereby corrected as shown below:

The title page should be deleted to appear as per attached title page.

Delete the abstract as filed and insert the following:

ABSTRACT

-- An improved seal for the inlet channel of a drawing furnace for optical fibers uses one or more silicone rubber discs, each having an aperture whose diameter is smaller than that of the preform. Burning of the silicone rubber discs can be avoided by choosing a disc material having a refractive index smaller than that of the preform, so that thermal radiation is not irradiated into the disc via the preform. The silicone rubber discs are further protected by a metal screen between the discs and the interior of the drawing furnace.--

United States Patent [19]

Figure 1:
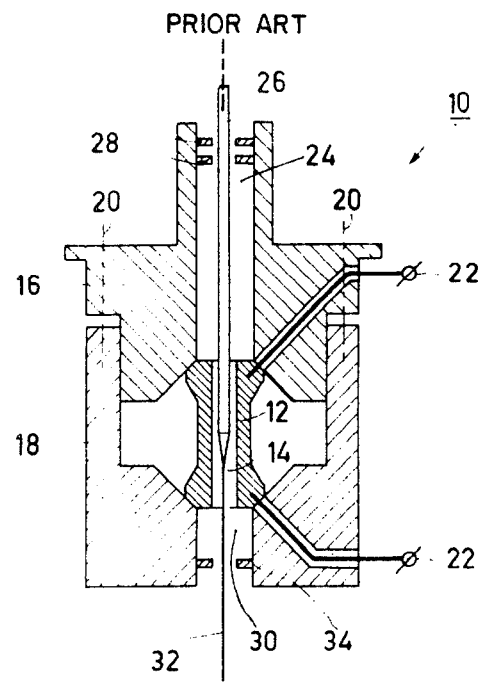
Figure 2:
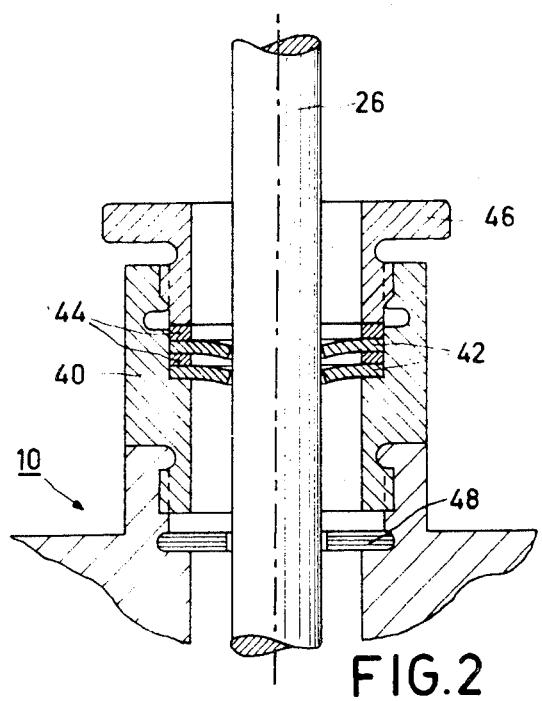

Janssen et al.

[11] Patent Number: 4,477,274
[45] Date of Patent: Oct. 16, 1984

[54] DEVICE FOR DRAWING AN OPTICAL FIBRE

[75] Inventors: Petrus J. Janssen; Victor A. van der Hulst, both of Eindhoven, Netherlands

[73] Assignee: U.S. Philips Corporation, New York, N.Y.

[21] Appl. No.: 531,973

[22] Filed: Sep. 14, 1983

[30] Foreign Application Priority Data

Jul. 27, 1983 [NL] Netherlands ............... 8302666

[51] Int. Cl.³ ............................................. C03B 37/025
[52] U.S. Cl. ............................................. 65/13; 65/1; 65/374.1
[58] Field of Search .................... 65/1, 2, 13, 374.1

[56] References Cited

U.S. PATENT DOCUMENTS

| | | | |
|---|---|---|---|
| 4,030,901 | 6/1977 | Kaiser | 65/2 |
| 4,309,201 | 1/1982 | Klop et al. | 65/2 |
| 4,400,190 | 8/1983 | Briere | 65/13 |

*Primary Examiner*—Robert Lindsay
*Attorney, Agent, or Firm*—Marc D. Schechter

[57] ABSTRACT

An improved sealing of the inlet channel of a drawing furnace for optical fibres can be achieved by using one or more silicon rubber discs having an aperture whose diameter is smaller than that of the preform.

Burning of the silicon rubber discs can be checked by a choice of the material for the discs having a refractive index smaller than that of the preform so that thermal radiation is not irradiated in the disc via the preform.

The silicon rubber discs are further protected by a metal screening between the discs and the interior of the drawing furnace.

7 Claims, 2 Drawing Figures

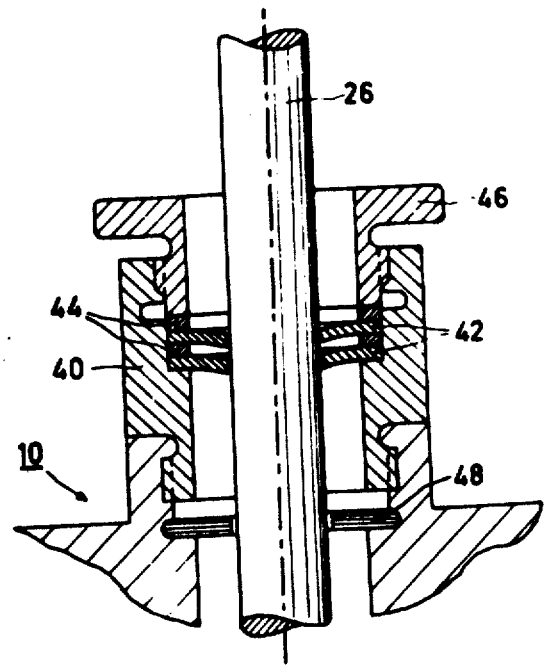

UNITED STATES PATENT AND TRADEMARK OFFICE
CERTIFICATE OF CORRECTION

PATENT NO. : 4,477,274
DATED : October 16, 1984
INVENTOR(S) : PETRUS J. JANSSEN; VICTOR A. VAN DER HULST It is certified that error appears in the above-identified patent and that said Letters Patent is hereby corrected as shown below:

IN THE TITLE PAGE - change "fibre" to --fiber--

Col. 1, In the title - change "FIBRE" to --FIBER--

After the title - before line 4, insert as a heading --BACKGROUND OF THE INVENTION-- line 5,  change "fibre" to --fiber--; change ", which" to --. The-- line 7,  change ", in which a" to --. A-- line 8,  after "preform" insert --,--; change "fibre" to --fiber--; after "drawn" insert --,--; after "heated" insert --in the heating space-- line 9,  change ", said" to --. The--; change "comprising" to --comprises--; and delete "to"

line 10, change "seal" to --for sealing-- line 14, change "as a result of which" to --resulting in-- line 15, change "fibre occurs" to --fiber--

UNITED STATES PATENT AND TRADEMARK OFFICE
CERTIFICATE OF CORRECTION

PATENT NO. : 4,477,274

DATED : October 16, 1984

INVENTOR(S) : PETRUS J. JANSSEN; VICTOR A. VAN DER HULST

It is certified that error appears in the above-identified patent and that said Letters Patent is hereby corrected as shown below:

Col. 1, lines 17 and 22, change "fibre" to --fiber-- line 18, after "4,309,201" insert --(Klop et al)--; change "A gas" to --Gas-- line 21, delete "not ad-"

line 22, change "versely influence the strength" to --avoid weakening--; delete "of"; change "said" to --the-- line 24, before "gas" insert --some--; change "flows remain" to --flow remains-- line 25, change "having for their result" to --, resulting in-- line 27, after "4,030,901" insert --(Kaiser)-- line 31, delete "of"; change "displacements" to --displacement--; change "and" to --, and there is-- line 32, change "friction occurs" to --frictional force-- line 35, change "sealing" to --seal--; change "friction" to --frictional force--

UNITED STATES PATENT AND TRADEMARK OFFICE
CERTIFICATE OF CORRECTION

PATENT NO. : 4,477,274
DATED : October 16, 1984
INVENTOR(S) : PETRUS J. JANSSEN; VICTOR A. VAN DER HULST It is certified that error appears in the above-identified patent and that said Letters Patent is hereby corrected as shown below:

Col. 1, between lines 37 and 38, insert as a centered heading:

--SUMMARY OF THE INVENTION-- line 39, change "fibre" to --fiber--; after "preform" insert --,-- (comma); after "which" insert --device-- line 40, delete "for the preform"

line 41, delete "seal-"

line 42, delete in its entirety and insert --seal without decreasing the fiber strength-- line 43, delete "enced"; change "and" to --with the preform. It is another object of the invention to provide such a device-- line 44, change "latter" to --sealing means-- line 46, change "this object is" to --these objects are--; delete "in"

line 47, change "that" to --by providing--; delete "for the preform is provided--

UNITED STATES PATENT AND TRADEMARK OFFICE
CERTIFICATE OF CORRECTION

PATENT NO. : 4,477,274
DATED : October 16, 1984
INVENTOR(S) : PETRUS J. JANSSEN; VICTOR A. VAN DER HULST It is certified that error appears in the above-identified patent and that said Letters Patent is hereby corrected as shown below:

Col. 1, line 50, change "silicon" to --silicone-- line 51, after "and" insert --having-- line 52, change ", said disc comprising" to --.  The disc has-- line 54, change "fibre, at" to --fiber.  At-- line 56, change "screening being" to --screen is-- line 57, change ", said" to --.  The-- ; change "screening comprising" to --screen comprises-- line 59, delete "a"; change "and the" to --therewith.  The--; change "which" to --the screen--

Col. 2, line 1, change "Said" to --The--; after "flow" insert --by convection--; after "using" insert --the-- line 5, after "resistant" insert --,-- (comma)

line 6, change "screening" to --screen--

UNITED STATES PATENT AND TRADEMARK OFFICE
CERTIFICATE OF CORRECTION

PATENT NO. : 4,477,274

DATED : October 16, 1984

INVENTOR(S) : PETRUS J. JANSSEN; VICTOR A. VAN DER HULST

It is certified that error appears in the above-identified patent and that said Letters Patent is hereby corrected as shown below:

Col. 2, line 9, change "Said" to --This-- line 12, change "as" to --. As--; change "of which" to --,-- (comma)

line 13, delete "occurring of"

line 14, begin a new paragraph with "The"; after "preform" insert --,-- (comma)

line 15, change "at this point" to --, at the location of the sealing means-- line 16, delete "yet"

line 17, change "which" to --(which would--; change "influences" to --influence--; change "thereof" to --thereof)-- line 18, after "material" insert --for the seal-- line 22, change "as" to --. As--; change "of which" to --,-- (comma)

UNITED STATES PATENT AND TRADEMARK OFFICE
CERTIFICATE OF CORRECTION

PATENT NO. : 4,477,274

DATED : October 16, 1984

INVENTOR(S) : PETRUS J. JANSSEN; VICTOR A. VANDER HULST

It is certified that error appears in the above-identified patent and that said Letters Patent is hereby corrected as shown below:

Col 2., line 23, change "sealing" to --seal--; after "without"

insert --formingline 24, delete "being formed"

line 26, change "sealing" to --seal-- line 27, change "silicon" to --silicone-- line 28, change "in" to --between the--; after "and"

insert --the radius of-- line 29, change "to be drawn into a fibre" to --,-- (comma)

line 32, change "silicon" to --silicone-- line 33, change "in" to --between the-- line 34, delete "to be drawn into a fibre"; after "and"

insert --the radius of-- line 35, change "silicon" to --silicone--; delete "to be"

line 37, before "a" insert --along--; delete "contact"

line 41, after "invention" insert --,-- (comma); change

"consist" to --consists--

UNITED STATES PATENT AND TRADEMARK OFFICE
CERTIFICATE OF CORRECTION

PATENT NO. : 4,477,274

DATED : October 16, 1984

INVENTOR(S) : PETRUS J. JANSSEN; VICTOR A. VANDER HULST

It is certified that error appears in the above-identified patent and that said Letters Patent is hereby corrected as shown below:

Col. 2, line 44, change "of this" to --,-- (comma); change "sealing" to --seal-- line 47, after "invention" insert --,-- (comma)

line 48, after "resistant" insert --,-- (comma); change "screening" to --screen-- delete lines 50 through 51 in their entirety and insert as a centered heading: --BRIEF DESCRIPTION OF THE DRAWING-- line 52, after "view" insert --, partly schematic-- line 53, change "fibres, and" to --fibers.-- line 55, delete "such"; after "invention" insert --for drawing optical fibers-- between lines 55 and 56, insert as a centered heading: --DESCRIPTION OF THE PREFERRED EMBODIMENTS-- line 56, after "The" insert --prior art--; change "fibres" to --fibers--

UNITED STATES PATENT AND TRADEMARK OFFICE
CERTIFICATE OF CORRECTION

PATENT NO. : 4,477,274
DATED : October 16, 1984
INVENTOR(S) : PETRUS J. JANSSEN; VICTOR A. VAN DER HULST It is certified that error appears in the above-identified patent and that said Letters Patent is hereby corrected as shown below:

Col. 2, line 58, after "12" insert --. Heat element 12 is made--;

change "which" to --, and it-- line 59, change "and" to --.-- (period)

line 60, change "which" to --Heat element 12-- line 61, change "screwed" to --screw-- line 62, after "by" insert --passing a--; delete "pas-"

line 63, change "sage and for" to --therethrough. For--;

after "purpose" insert --,-- (comma)

line 65, begin a new paragraph with "The"

line 66, delete "-in"; change "in" to --into-- line 67, change ", in which" to --. In the--; after

"aperture" insert --24,--

Col. 3, line 1, change "formed fiber 32," to --fiber 32.--;

change "in which" to --In the-- line 2, after "aperture" insert --,-- (comma)

line 3, delete "use of the"; after "invention" insert

--, described below,--

UNITED STATES PATENT AND TRADEMARK OFFICE
CERTIFICATE OF CORRECTION

PATENT NO. : 4,477,274

DATED : October 16, 1984

INVENTOR(S) : PETRUS J. JANSSEN; VICTOR A. VAN DER HULST

It is certified that error appears in the above-identified patent and that said Letters Patent is hereby corrected as shown below:

Col. 3, line 4, after "to" insert --use in--; change "but" to --. It may also be used--; delete "is also"

line 5, delete "possible"

line 7, change "of" to --in-- line 13, delete "a"

line 15, change "silicon" to --silicone--; change "," to --. Discs 42 are-- line 16, after "other" insert --and from nut 46--; delete "a"; change "ring 44 and" to --rings 44. They are-- line 17, change "a" to --the--; begin a new paragraph with "A"

line 19, change "Said screening" to --The screen 48-- line 21, change "aperture" to --apertures--; change "silicon" to --silicone-- line 22, change "has right angles and is" to --have right-angled edges, and are--

UNITED STATES PATENT AND TRADEMARK OFFICE
CERTIFICATE OF CORRECTION

PATENT NO. : 4,477,274

DATED : October 16, 1984

INVENTOR(S) : PETRUS J. JANSSEN; VICTOR A. VAN DER HULST

It is certified that error appears in the above-identified patent and that said Letters Patent is hereby corrected as shown below:

Col. 3, line 24, change "thickness" to --thicknesses--; change "silicon" to --silicone--; change "is" to --are line 25, change "in" to --between the-- line 26, after "and" insert --the radius of--; begin a new paragraph with "The"; change "silicon" to --silicone-- line 27, change "they form" to --their edges contact the preform 26--; after "substantially" insert --along--; after "line" insert --.-- (period)

line 28, delete "contact with the preform 26."; delete "of this"

line 30, change "silicon" to --silicone-- line 32, change "silicon" to --silicone--; change "screening" to --screen-- line 34, change "silicon" to --silicone-- line 35, change "screenings" to -- screens; change "chosen and placed" to --used--

UNITED STATES PATENT AND TRADEMARK OFFICE
CERTIFICATE OF CORRECTION

PATENT NO. : 4,477,274
DATED : October 16, 1984
INVENTOR(S) : PETRUS J. JANSSEN; VICTOR A. VAN DER HULST It is certified that error appears in the above—identified patent and that said Letters Patent is hereby corrected as shown below:

Col. 3, line 38, begin a new paragraph with "For"

line 39, change "fibres" to --fibers-- line 44, change "of" to --in-- line 45, change "of" (first occurrence) to --in--; change "fibres," to --fibers produced therefrom.-- line 46, delete "for example, for optical transmission."

line 47, change "of" (first occurrence) to --in--; after "preform" insert --,-- (comma)

line 48, delete "it can be achieved that"

Col. 4, line 1, change "fibre is" to --fiber can be--; change "fibre" (second occurrence) to --fiber--

UNITED STATES PATENT AND TRADEMARK OFFICE
CERTIFICATE OF CORRECTION

PATENT NO. : 4,477,274
DATED : October 16, 1984
INVENTOR(S) : PETRUS J. JANSSEN; VICTOR A. VAN DER HULST It is certified that error appears in the above—identified patent and that said Letters Patent is hereby corrected as shown below:

Delete claims 1 - 7, and add new claims 1-7, as follows.

1. A device for drawing an optical fiber from a cylindrical solid preform having large and small diameters, said device comprising:

a heating element having a heating space with an inlet channel and an outlet channel, said inlet channel having a wall; and sealing means for sealing a gap between the wall of the inlet channel and a preform inserted into the inlet channel;

characterized in that the sealing means comprises:

at least one exchangeable, flat, flexible disc made of a polymeric organosilicon compound having a refractive index less than the refractive index of the preform, said disc having a 100% modulus between 0.5 and 5 MPa, said disc having a central aperture with a diameter at least 1 millimeter less than the smallest diameter of the preform; and

UNITED STATES PATENT AND TRADEMARK OFFICE
CERTIFICATE OF CORRECTION

PATENT NO. : 4,477,274

DATED : October 16, 1984

INVENTOR(S) : PETRUS J. JANSSEN; VICTOR A. VAN DER HULST

It is certified that error appears in the above—identified patent and that said Letters Patent is hereby corrected as shown below:

at least one exchangeable, temperature-resistant, heat-conducting screen arranged between the disc and the heating space, said screen having a central aperture with a diameter larger than the largest diameter of the preform but not more than 1 millimeter larger.

2. A device as claimed in claim 1 characterized in that the disc has a 100% modulus between 1 and 2 MPa.

3. A device as claimed in claim 1 characterized in that the disc has a thickness which is less than the gap between the wall of the inlet channel and the preform.

UNITED STATES PATENT AND TRADEMARK OFFICE
CERTIFICATE OF CORRECTION

PATENT NO. : 4,477,274
DATED : October 16, 1984
INVENTOR(S) : PETRUS J. JANSSEN; VICTOR A. VAN DER HULST It is certified that error appears in the above—identified patent and that said Letters Patent is hereby corrected as shown below:

4. A device as claimed in claim 3 characterized in that the central aperture of the disc and the diameter of the preform are chosen so that the disc contacts the preform along a line.

5. A device as claimed in claim 1 characterized in that the sealing means comprises two exchangeable, flat, flexible discs provided in the inlet channel spaced from one another.

6. A device as claimed in claim 1 characterized in that the screen is a cooled stainless steel ring.

UNITED STATES PATENT AND TRADEMARK OFFICE
CERTIFICATE OF CORRECTION

PATENT NO. : 4,477,274

DATED : October 16, 1984

INVENTOR(S) : Petrus J. Janssen et al.

It is certified that error appears in the above-identified patent and that said Letters Patent is hereby corrected as shown below:

7. A device as claimed in claim 1, characterized in that the polymeric organosilicon compound is polydimethylsiloxane.

Signed and Sealed this

Twenty-sixth Day of November 1985

[SEAL]

Attest:

Attesting Officer

DONALD J. QUIGG

Commissioner of Patents and Trademarks